(12) United States Patent
Krug, Jr. et al.

(10) Patent No.: US 8,191,575 B2
(45) Date of Patent: Jun. 5, 2012

(54) DOUBLE POPPET QUICK CONNECT

(75) Inventors: Francis R. Krug, Jr., Highland, NY (US); Robert K. Mullady, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 765 days.

(21) Appl. No.: 12/101,183

(22) Filed: Apr. 11, 2008

(65) Prior Publication Data
US 2009/0255598 A1    Oct. 15, 2009

(51) Int. Cl.
*F16L 37/36* (2006.01)

(52) U.S. Cl. .................. 137/614.06; 137/226; 137/513; 137/614.18; 137/15.18

(58) Field of Classification Search ............. 137/614.05, 137/614.16, 614.17, 613, 614, 614.03, 614.04, 137/512.2, 513, 226, 614.18, 637.5, 599.16, 137/599.18, 15.17, 15.18; 251/149.6
See application file for complete search history.

(56) References Cited

U.S. PATENT DOCUMENTS

| | | | | |
|---|---|---|---|---|
| 1,296,160 A * | 3/1919 | Butterfield | ..................... | 137/226 |
| 1,830,480 A * | 11/1931 | Myers | ..................... | 137/614.05 |
| 1,865,231 A * | 6/1932 | Buck | ..................... | 137/614.19 |
| 2,983,526 A * | 5/1961 | Abbey et al. | ..................... | 137/614.04 |
| 3,730,221 A * | 5/1973 | Vik | ..................... | 137/614 |
| 3,777,771 A | 12/1973 | DeVisscher | ..................... | 137/1 |
| 4,060,219 A * | 11/1977 | Crawford | ..................... | 251/149.6 |
| 4,373,551 A * | 2/1983 | Shindelar | ..................... | 137/614.06 |
| 4,465,096 A | 8/1984 | Voisine | ..................... | 137/614.04 |
| 4,510,969 A | 4/1985 | Rodth | ..................... | 137/614.05 |
| 4,582,347 A | 4/1986 | Wilcox et al. | ..................... | 285/12 |
| 4,982,761 A | 1/1991 | Kreczko et al. | ..................... | 137/614.03 |
| 5,129,423 A * | 7/1992 | Fournier et al. | ..................... | 137/614.05 |
| 5,337,782 A * | 8/1994 | Wilcox | ..................... | 137/614.03 |
| 5,415,200 A | 5/1995 | Haunhorst et al. | ..................... | 137/614.05 |
| 5,452,736 A * | 9/1995 | Arosio | ..................... | 137/614.03 |
| 5,592,970 A * | 1/1997 | Stucchi et al. | ..................... | 137/614.03 |
| 5,628,343 A | 5/1997 | Lan | ..................... | 137/614.05 |
| 5,937,899 A * | 8/1999 | Zeiber | ..................... | 137/614 |
| 5,996,624 A * | 12/1999 | Ekman | ..................... | 137/614.03 |
| 6,041,818 A | 3/2000 | Schadewald et al. | ..................... | 137/614.19 |
| 6,056,010 A * | 5/2000 | Wells | ..................... | 137/614.06 |
| 6,089,268 A * | 7/2000 | Troiani et al. | ..................... | 251/149.6 |
| 6,237,631 B1 | 5/2001 | Giesler et al. | ..................... | 137/614.04 |
| 6,354,564 B1 | 3/2002 | Van Scyoc et al. | ..................... | 251/149 |
| 6,860,290 B2 * | 3/2005 | Knuthson | ..................... | 137/614.03 |
| 6,892,999 B2 * | 5/2005 | Hall et al. | ..................... | 251/149.6 |
| 7,168,449 B2 | 1/2007 | Giagnoli et al. | ..................... | 137/614.04 |
| 7,509,969 B2 * | 3/2009 | Huang | ..................... | 137/226 |
| 7,748,407 B2 * | 7/2010 | Colby | ..................... | 137/614.2 |
| 2006/0243332 A1 | 11/2006 | Harvey et al. | ..................... | 137/614.04 |
| 2007/0023083 A1 * | 2/2007 | Huang | ..................... | 137/226 |

* cited by examiner

*Primary Examiner* — Craig Schneider
*Assistant Examiner* — Craig J Price
(74) *Attorney, Agent, or Firm* — Dennis Jung, Esq.; Kevin P. Radigan, Esq.; Heslin Rothenberg Farley & Mesiti P.C.

(57) ABSTRACT

Two independent poppets/valves that open and close independently as a quick connect coupling is mated and unmated are employed as part of a cooling system for high end data processing systems. More particularly, the present invention comprises a quick connect poppet valve having two internal, independently functioning sealing seats therein disposed within a serially connected flow path to prevent leakage and to minimize the effects of debris.

18 Claims, 3 Drawing Sheets

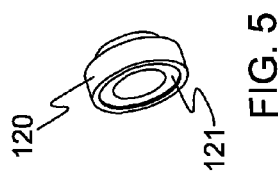
FIG. 3
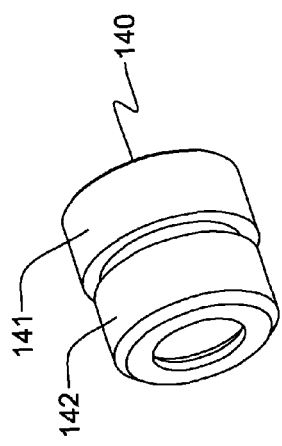
FIG. 5
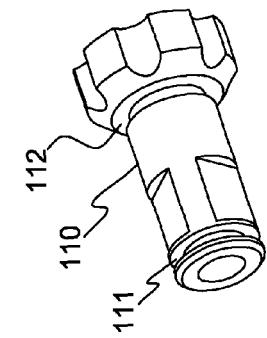
FIG. 4
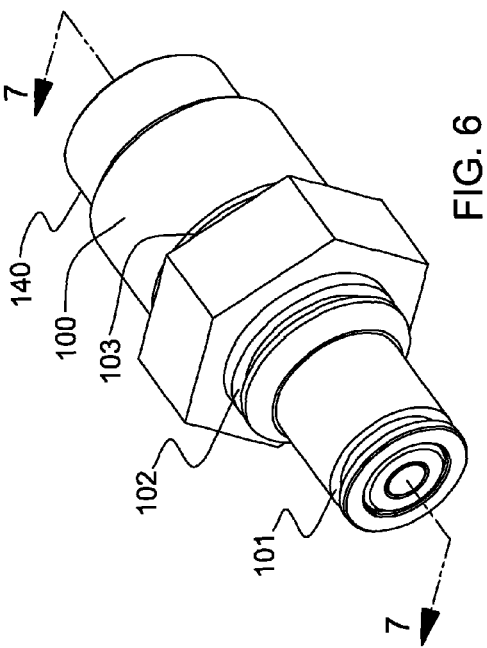
FIG. 6
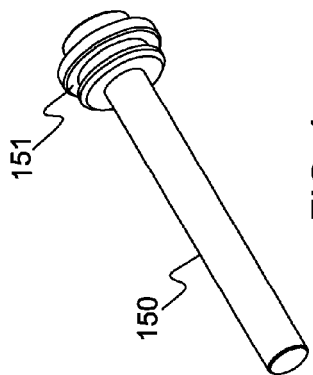
FIG. 2A
FIG. 2B

DOUBLE POPPET QUICK CONNECT

TECHNICAL FIELD

The present invention is generally directed to quick disconnect valves. More particularly, the present invention is directed to valves which provide extra security against leakage and the passage of water born contaminants. Even more particularly, the present invention is directed to disconnect valves employed in the cooling systems of large scale mainframe computer systems.

BACKGROUND OF THE INVENTION

The use of water cooling in high end data processing servers also brings with it the desire to employ quick connect/disconnect couplings for ease of installation, maintenance and service. However, with most quick connect valves there is a single level of sealing that occurs within the valve body. If debris or other mechanisms prevent the smooth operation of these valves, then it is more likely that cooling water and/or other cooling fluids might escape. The present invention provides two means with which to close off the water stream to insure proper closure.

In addition to, but in conjunction with the problem of leakage, it is to be noted that water and or other cooling fluids very often develop the presence of contaminants in the form of debris that moves with the fluid flow. Sometimes this debris can become lodged in a valve seat and produce the undesirable leakage condition referred to above. Even if the cooling fluid is initially of the purest form and contaminant free it is often the case that due to the interaction of the fluid with other portions of the cooling system contaminants and/or debris are introduced into the fluid flow.

From the above, it is therefore seen that there exists a need in the art to overcome the deficiencies and limitations described herein and above.

SUMMARY OF THE INVENTION

The present invention provides two independent poppets/valves that open and close independently as a quick connect coupling is mated and unmated. More particularly, the present invention comprises a quick connect poppet valve having two internal, independently functioning sealing seats therein disposed within a serially connected flow path.

In accordance with one embodiment of the present invention, a quick connect poppet valve comprises a housing having a central passage. A first plunger disposed and movable within the passage of the housing against which a first seal is provided. A second plunger is disposed and movable within a second sealing seat which interlocks with the housing. A first biasing device is disposed between the second sealing seat and the first plunger. A retaining member engages the second sealing seat and a second biasing device is disposed so as to urge the second plunger against the second sealing seat with which a second seal is provides. The second biasing device is disposed between the second sealing seat and the retaining member.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 2A is an isometric view of a first plunger employed in the present invention;

FIG. 2B is an end view of the plunger shown in FIG. 2A;

FIG. 3 is a more detailed isometric view of the secondary seat shown in FIG. 1;

FIG. 4 is a more detailed isometric view of the second plunger shown in FIG. 1;

FIG. 5 is a more detailed, isometric view of the seat shown in FIG. 1;

FIG. 6 is a more detailed, isometric view of the housing shown in FIG. 1.

DETAILED DESCRIPTION

Figure 1:
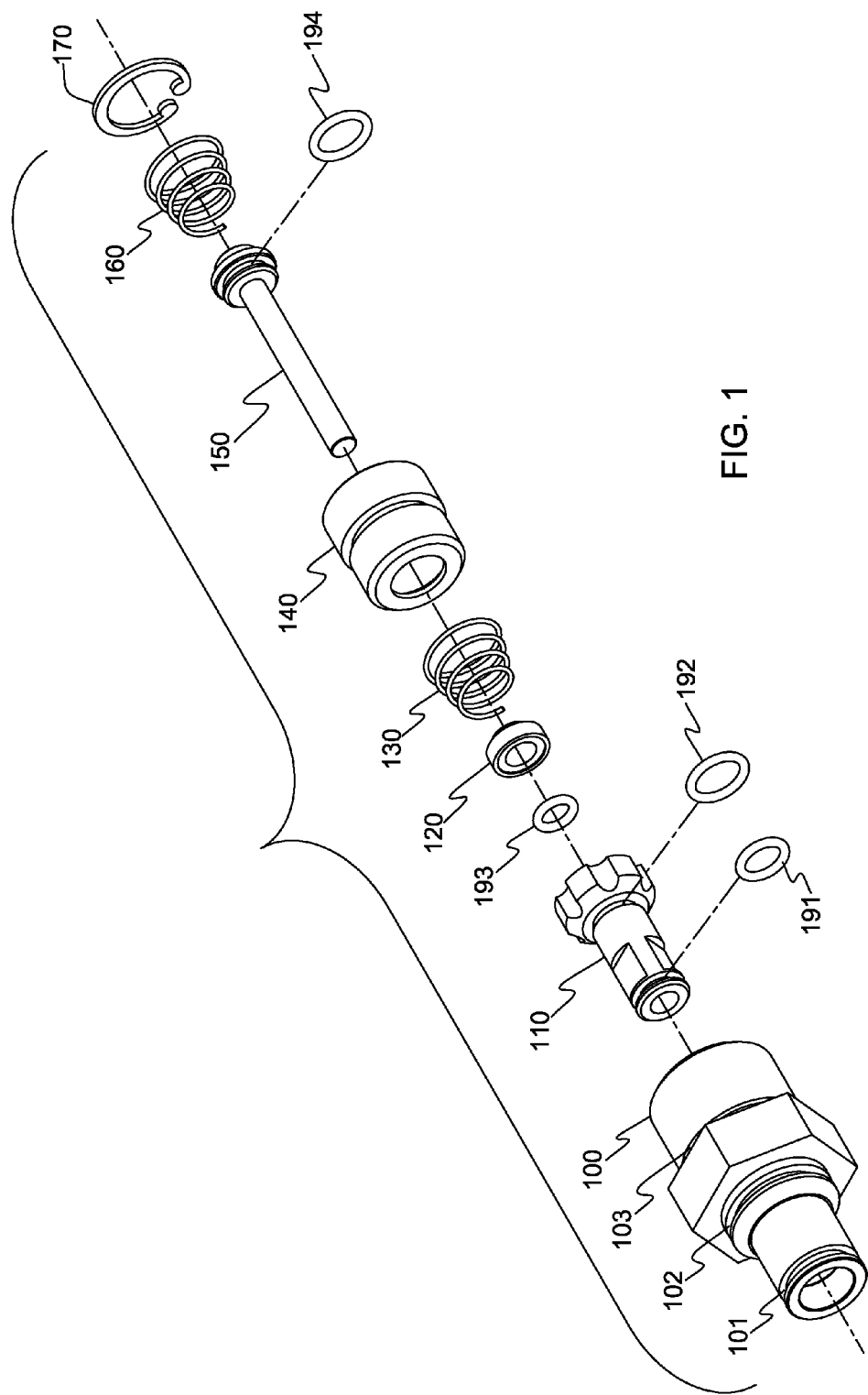
FIG. 1 is an exploded, isometric view of a poppet valve in accordance with the present invention.
Figure 7:
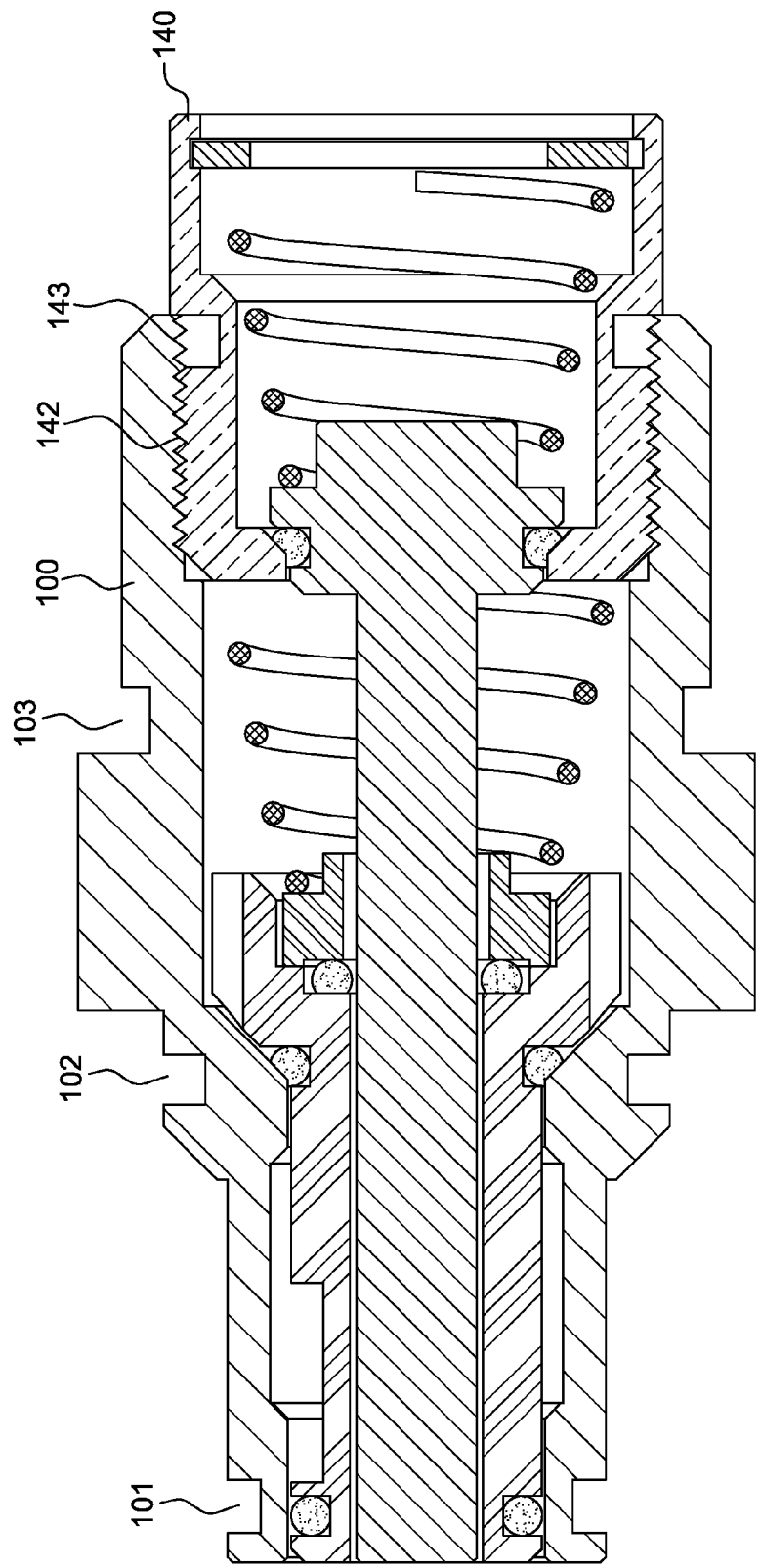
FIG. 7 is a cutaway assembled view of the poppet valve shown in FIG. 1.

In FIG. 1 there is shown an exploded view of one embodiment of the present invention. The valve includes a main poppet seal shown on the left employing two O-ring seals 191 and 192. However, the present invention employs a second poppet, shown on the right, which slides thru the center of the primary poppet. This second seal is implemented using O-ring 194 as shown. Each poppet has its own sealing surface and is actuated by a spring force. As the quick connect is mated, both poppets are actuated simultaneously to the open position. As the quick connect is unmated, the spring force closes the poppets. If either one does not close fully, the other moves independently to provide the desired sealing. FIG. 7 depicts a cutaway assembled view of the poppet valve shown in FIG. 1.

More particularly, the embodiment shown in FIG. 1 includes housing 100 which receives first plunger 110. A first seal is provided between these two members through the use of O-ring seals 191 and 192 which sit in channels 111 and 112 of plunger 110 respectively (see FIG. 2A). Housing 100 includes a central passage for the flow of water or other fluid. In particular, for purposes of mating with a female portion of a quick connect valve, there are also provided grooves or channels 101 and 102 on housing 100 (see FIGS. 6 and 7 for greater detail). Channels or grooves 101 or 102 are also provided with O-ring seals (not shown). A second sealing seat 140 is also provided. A second seal is provided in the present invention through the use of second plunger 150 which includes O-ring 194 disposed within channel or groove 151 (see FIG. 4). Secondary seat 140 is also preferably provided with a mechanism for interlocking with housing 100. In preferred embodiments of the present invention this interlocking mechanism is provided by threaded portion 142 (see FIG. 7). A corresponding threaded portion (143 in FIG. 7) is provided on housing 100. Second plunger 150 is disposed through a central opening in secondary seat 140 and mates with floating gland seat 120. Compressible bias means 130 is disposed between gland seat 120 and secondary seat 140. O-ring 193 is disposed within groove 121 on gland seat 120 (see FIG. 5). The seal provided by O-ring 193 is often described as a traveling seal and its primary function is to keep excess water to a minimum. Second plunger 150 is retained within the assembly by means of retaining member 170. Additionally, second plunger 150 is urged against secondary seat 140 by means of compressible bias mechanism 160.

It should be noted that, while the description above refers to a preferred embodiment of the present invention, many other variations are possible. In particular, compressible bias means 130 and 160 are shown as helical springs. However, any other convenient compressible structure may also be employed. It is also noted that the description above refers to the use of O-rings. However, other sealing structures may be employed such as lip seals. The above description also indicates that threads are provided for mating second seat 14 to housing 100. However, any convenient mechanism may be provided for this purpose. In particular, a pin and groove structure or similar arrangement may also be employed. Additionally, is noted that retaining member 170 is preferably provided as a retaining ring which rests within an interior groove on second seat 140 (not visible). However, any other convenient mechanism including a threaded device may be employed for this purpose. It is also noted that first plunger 110 of the present invention may also include a triangularly (prismoidally, in a three dimensional view) shaped insert around which water (or other fluid) flows in the passage made between the flats of the prism and the interior walls of first plunger 110 when the valve is in use, as shown in FIG. 2B.

The valve assembly shown in FIG. 1 also has the advantage that its construction and assembly do not entail the use of any special materials, assembly process, apparatus or material in its construction. Conventional materials such as brass, aluminum, stainless steel and the like are all easily employed and assembled.

While the invention has been described in detail herein in accordance with certain preferred embodiments thereof, many modifications and changes therein may be effected by those skilled in the art. Accordingly, it is intended by the appended claims to cover all such modifications and changes as fall within the spirit and scope of the invention.

What is claimed is:

1. A valve comprising:
    a quick-connect poppet valve, the quick-connect poppet valve comprising:
        a housing including a central passage there through;
        a first plunger disposed and movable within said central passage of said housing and against which a first seal is provided between the first plunger and the housing;
        a second plunger disposed and movable within the central passage of the housing and within a second sealing seat, and against which a second seal is provided between the second plunger and the second sealing seat, said second sealing seat interlocking with said housing, wherein the second plunger is disposed at least partially within the first plunger;
        a first biasing device disposed between said second sealing seat and said first plunger; and
        a second biasing device disposed so as to urge said second plunger against said second sealing seat, said second biasing device being retained within said second sealing seat by a retaining member engaging said second sealing seat, said first plunger and said second plunger being individually actuated within the central passage of the housing independent of one another, wherein the first seal is provided by the first plunger independent of actuation of the second plunger and wherein the second seal is provided by the second plunger independent of actuation of the first plunger.

2. The valve of claim 1 in which said first biasing device is a spring.

3. The valve of claim 1 in which said first biasing device is a helical spring.

4. The valve of claim 1 in which said second biasing device is a spring.

5. The valve of claim 1 in which said second biasing device is a helical spring.

6. The valve of claim 1 in which said second seal is a circular seal.

7. The valve of claim 1 in which said retaining member is a retaining clip disposed within a groove in said second sealing seat.

8. The valve of claim 1 in which said retaining member is threaded into said second sealing seat.

9. The valve of claim 1 in which said second sealing seat is threaded into said housing.

10. The valve of claim 1 in which said housing comprises material selected from the group consisting of brass, aluminum and stainless steel.

11. The valve of claim 1 in which said first plunger comprises material selected from the group consisting of brass, aluminum and stainless steel.

12. The valve of claim 1 in which said second plunger comprises material selected from the group consisting of brass, aluminum and stainless steel.

13. The valve of claim 1 in which said second sealing seat comprises material selected from the group consisting of brass, aluminum and stainless steel.

14. The valve of claim 1, wherein the first plunger and the second plunger are exposed at a common end of the quick-connect poppet valve responsive to the first seal being provided between the first plunger and the housing and the second seal being provided between the second plunger and the second sealing seat.

15. A valve comprising:
    a quick-connect poppet valve, the quick-connect poppet valve comprising:
        a housing including a central passage there through;
        a first plunger disposed and movable within said central passage of said housing and against which a first seal is provided between the first plunger and the housing;
        a second plunger disposed and movable within the central passage of the housing and within a second sealing seat, and against which a second seal is provided between the second plunger and the second sealing seat, said second sealing seat interlocking with said housing, wherein the second plunger is disposed at least partially within the first plunger;
        a first biasing device disposed between said second sealing seat and said first plunger;
        a floating gland seal disposed between said first biasing device and at least a portion of said first plunger; and
        a second biasing device disposed so as to urge said second plunger against said second sealing seat, said second biasing device being retained within said second sealing seat by a retaining member engaging said second sealing seat, said first plunger and said second plunger being individually actuated within the central passage of the housing independent of one another, wherein the first seal is provided by the first plunger independent of actuation of the second plunger and wherein the second seal is provided by the second plunger independent of actuation of the first plunger.

16. The valve of claim 15 in which said floating gland seal employs a sealing mechanism which is a circular seal.

17. The valve of claim 15 in which said floating gland seal comprises material selected from the group consisting of brass, aluminum and stainless steel.

18. A method for preventing fluid leakage, the method comprising:

provinding a quick connect poppet valve comprising a housing and a central passage passing through the housing, with a first poppet plunger disposed and movable within said central passage of the quick connect poppet valve and against which a first seal is provided between the first poppet plunger and the housing, and with a second poppet plunger disposed and movable within the central passage of the housing and within a second sealing seat and against which a second seal is provided between the second poppet plunger and the second sealing seat, the second sealing seat interlocking with the housing, the second plunger being disposed at least partially within the first plunger, and the first poppet plunger and the second poppet plunger being individually actuated within the central passage of the housing independent of one another, wherein the first seal is provided by the first poppet plunger independent of actuation of the second poppet plunger and wherein the second seal is provided by the second poppet plunger independent of actuation of the first poppet plunger.

* * * * *